(12) United States Patent
Zhang et al.

(10) Patent No.: US 11,310,316 B2
(45) Date of Patent: Apr. 19, 2022

(54) METHODS, DEVICES AND COMPUTER PROGRAM PRODUCTS FOR STORING AND ACCESSING DATA

(71) Applicant: EMC IP Holding Company LLC, Hopkinton, MA (US)

(72) Inventors: Ruixue Zhang, Shanghai (CN); Pengfei Wu, Shanghai (CN); Zhenzhen Lin, Shanghai (CN); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/795,766

(22) Filed: Feb. 20, 2020

(65) Prior Publication Data

US 2021/0126970 A1  Apr. 29, 2021

(30) Foreign Application Priority Data

Oct. 29, 2019  (CN) .......................... 201911038969.7

(51) Int. Cl.
*H04L 29/08* (2006.01)
*G06F 16/22* (2019.01)
*H04L 67/1097* (2022.01)

(52) U.S. Cl.
CPC ...... *H04L 67/1097* (2013.01); *G06F 16/2255* (2019.01)

(58) Field of Classification Search
CPC .......................... H04L 67/1097; G06F 16/2255
See application file for complete search history.

(56) References Cited

U.S. PATENT DOCUMENTS

| | | | | |
|---|---|---|---|---|
| 9,158,927 | B1* | 10/2015 | Franklin | G06F 21/602 |
| 9,483,657 | B2* | 11/2016 | Paul | G06F 21/6245 |
| 2003/0204602 | A1* | 10/2003 | Hudson | H04L 67/06 |
| | | | | 709/228 |
| 2007/0150596 | A1* | 6/2007 | Miller | G06F 21/10 |
| | | | | 709/226 |
| 2008/0289006 | A1* | 11/2008 | Hock | H04L 67/108 |
| | | | | 726/4 |
| 2009/0106393 | A1* | 4/2009 | Parr | H04L 67/28 |
| | | | | 709/218 |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

*Primary Examiner* — Azizul Choudhury
(74) *Attorney, Agent, or Firm* — Ryan, Mason & Lewis, LLP

(57) ABSTRACT

Methods, devices and computer program products for storing and accessing data are provided, and can effectively improve the performance and scalability of a storage system. For example, a method comprises sending, at a client device and to a seed server of a plurality of servers communicatively coupled to the client device, a request for storing data; receiving a response to the request from the seed server, the response comprising an indication on at least one server of the plurality of servers for storing the data into a target storage device; and sending, to the at least one server, at least one request for storing the data into the target storage device, such that the at least one server stores the data into the target storage device.

20 Claims, 10 Drawing Sheets

(56) References Cited

U.S. PATENT DOCUMENTS

| | | | |
|---|---|---|---|
| 2014/0359066 A1* | 12/2014 | Liu | H04L 67/2861 709/217 |
| 2015/0026784 A1* | 1/2015 | Kurkure | H04L 63/083 726/7 |
| 2015/0293949 A1* | 10/2015 | Lillibridge | G06F 3/0641 707/692 |
| 2018/0205393 A1* | 7/2018 | Guan | G06F 16/2255 |

* cited by examiner

METHODS, DEVICES AND COMPUTER PROGRAM PRODUCTS FOR STORING AND ACCESSING DATA

RELATED APPLICATION(S)

The present application claims priority to Chinese Patent Application No. 201911038969.7, filed Oct. 29, 2019, and entitled "Methods, Devices and Computer Program Products for Storing and Accessing Data," which is incorporated by reference herein in its entirety.

FIELD

Embodiments of the present disclosure generally relate to the field of data storage, and more specifically, to methods, devices and computer program products for storing and accessing data.

BACKGROUND

With the changing requirements of both business and applications, customers often need to store data in different cloud storage devices. Since different cloud providers typically provide different storage interfaces, the customers need to interact with different storage interfaces. This is cumbersome and time-consuming. As such, it would be desirable to provide a unified storage architecture for a multi-cloud environment.

SUMMARY

Embodiments of the present disclosure provide methods, devices and computer program products for storing and accessing data.

In a first aspect of the present disclosure, there is provided a method for storing data. The method comprises: sending, at a client device and to a seed server of a plurality of servers communicatively coupled to the client device, a request for storing data; receiving a response to the request from the seed server, the response comprising an indication on at least one server of the plurality of servers for storing the data into a target storage device; and sending, to the at least one server, at least one request for storing the data into the target storage device, such that the at least one server stores the data into the target storage device.

In a second aspect of the present disclosure, there is provided a method for storing data. The method comprises: receiving, from a client device communicatively coupled to a plurality of servers, a request for storing data; determining, based on the request and from the plurality of servers, at least one server for storing the data from the client device into a target storage device; and sending, to the client device, a response to the request, the response comprising an indication on the at least one server.

In a third aspect of the present disclosure, there is provided a method for storing data. The method comprises: receiving, at a server and from a client device communicatively coupled to a plurality of servers comprising the server, a request for storing at least a part of data into a target storage device, wherein the request is sent by the client device in response to receiving an indication on the server from a seed server of the plurality of servers; extracting the at least a part of the data from the request; and storing the at least a part of the data into the target storage device.

In a fourth aspect of the present disclosure, there is provided a method for accessing data. The method comprises: sending, at a client device and to a seed server of a plurality of servers communicatively coupled to the client device, a request for accessing data; receiving a response to the request from the seed server, the response comprising an indication on at least one server of the plurality of servers for obtaining the data to be accessed from a target storage device; sending, to the at least one server, at least one request for obtaining the data to be accessed from the target storage device, such that the at least one server obtains the data from the target storage device; and receiving, from the at least one server, the data for access.

In a fifth aspect of the present disclosure, there is provided a method for accessing data. The method comprises: receiving, from a client device communicatively coupled to a plurality of servers, a request for accessing data; determining, based on the request and from the plurality of servers, at least one server for obtaining the data to be accessed from a target storage device; and sending, to the client device, a response to the request, the response comprising an indication on the at least one server.

In a sixth aspect of the present disclosure, there is provided a method for accessing data. The method comprises: receiving, at a server and from a client device communicatively coupled to a plurality of servers comprising the server, a request for obtaining at least a part of data to be accessed from a target storage device, wherein the request is sent by the client device in response to receiving an indication on the server from a seed server of the plurality of servers; determining, based on the request, a storage location of the at least a part of the data in the target storage device; obtaining the at least a part of the data from the storage location; and sending the at least a part of the data to the client device for access by the client device.

In a seventh aspect of the present disclosure, there is provided a client device. The client device comprises at least one processing unit and at least one memory. The at least one memory is coupled to the at least one processing unit and stores instructions for execution by the at least one processing unit. The instructions, when executed by the at least one processing unit, cause the client device to perform the method according to the first or fourth aspect of the present disclosure.

In an eighth aspect of the present disclosure, there is provided a server. The server comprises at least one processing unit and at least one memory. The at least one memory is coupled to the at least one processing unit and stores instructions for execution by the at least one processing unit. The instructions, when executed by the at least one processing unit, cause the server to perform the method according to the second or fifth aspect of the present disclosure.

In a ninth aspect of the present disclosure, there is provided a server. The server comprises at least one processing unit and at least one memory. The at least one memory is coupled to the at least one processing unit and stores instructions for execution by the at least one processing unit. The instructions, when executed by the at least one processing unit, cause the server to perform the method according to the third or sixth aspect of the present disclosure.

In a tenth aspect of the present disclosure, there is provided a computer program product. The computer program product is tangibly stored in a computer storage medium and includes machine-executable instructions. The machine-executable instructions, when executed by a device, cause the device to perform the method according to the first or fourth aspect of the present disclosure.

In an eleventh aspect of the present disclosure, there is provided a computer program product. The computer program product is tangibly stored in a computer storage medium and includes machine-executable instructions. The machine-executable instructions, when executed by a device, cause the device to perform the method according to the second or fifth aspect of the present disclosure.

In a twelfth aspect of the present disclosure, there is provided a computer program product. The computer program product is tangibly stored in a computer storage medium and includes machine-executable instructions. The machine-executable instructions, when executed by a device, cause the device to perform the method according to the third or sixth aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

Throughout the drawings, the same or similar reference symbols refer to the same or similar elements.

DETAILED DESCRIPTION

Figure 1:
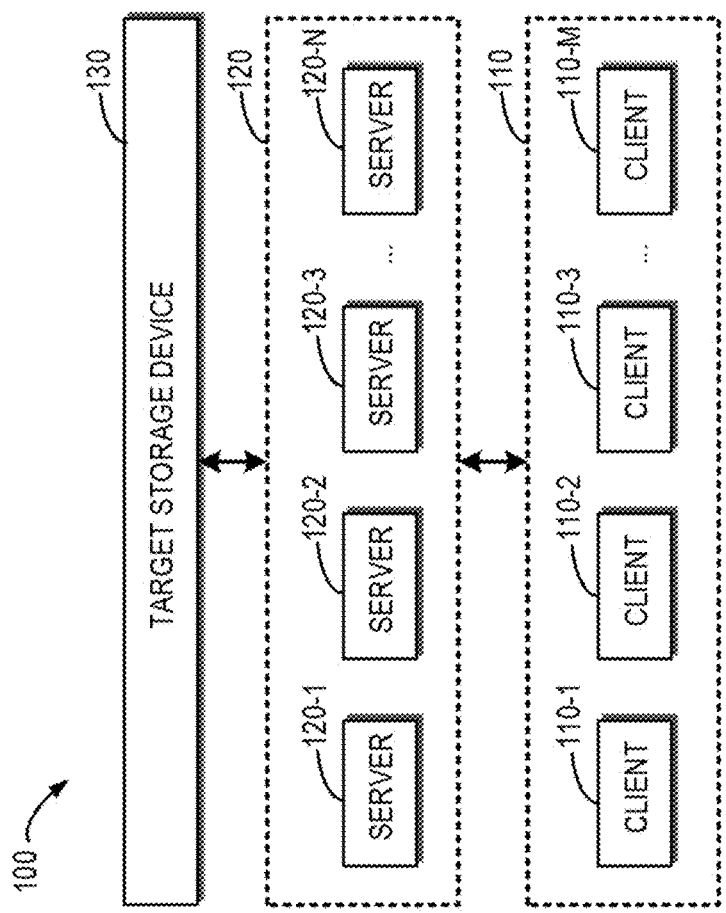
FIG. 1 illustrates a block diagram of an example storage system in which embodiments of the present disclosure can be implemented.

Illustrative embodiments of the present disclosure will now be described in more detail with reference to the drawings. Although the illustrative embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As described above, with the changing requirements of both business and applications, customers often need to store data in different cloud storage devices. Since different cloud providers usually provide different storage interfaces, the customers need to interact with different storage interfaces. This is cumbersome and time-consuming. As such, it would be desirable to provide a unified storage architecture for a multi-cloud environment.

Centralized storage architecture and decentralized storage architecture are currently both widely used storage architectures, each of which has a large number of customer adoptions. In the centralized storage architecture, all clients communicate with a centralized storage device for data storage and access. In the decentralized storage architecture, all clients are treated as symmetrical peers, and data is stored in these decentralized peers. As compared with the centralized storage architecture, the decentralized storage architecture can achieve higher throughput. However, customers that adopt centralized and decentralized storage architecture are all pursuing a method to migrate the system into a unified object storage architecture.

Some traditional solutions can construct a unified object storage system for a multi-cloud environment using the centralized storage architecture. These solutions can provide a unified storage interface for clients via a centralized server, and implement a unified storage interface in the centralized server for interfacing with different cloud providers. Metadata, such as mapping information between data and cloud storage addresses and the like, is stored in a centralized database, for subsequent data retrieving and enumeration.

However, these traditional solutions often have many problems. For example, failure of any component at the centralized server may cause the entire storage system to be unable to operate normally. If a great number of clients are connected simultaneously to the centralized server, the overall throughput will be significantly reduced. Moreover, the storage architecture is difficult to scale and is unable to integrate with the existing decentralized storage architecture, and the like.

Embodiments of the present disclosure provide a solution for storing and accessing data. In the solution, a decentralized unified object storage architecture is implemented to solve the above problems and one or more of other potential problems. The solution can easily integrate with existing storage architectures. In addition, due to the decentralized architecture, the solution is easy to scale, avoids a single point of failure, and achieves ultra-high throughput.

With reference to the drawings, embodiments of the present disclosure will be further described below. FIG. 1 illustrates a block diagram of an example storage system 100 in which embodiments of the present disclosure can be implemented. It is to be understood that the structure of the storage system 100 is shown merely as an example, without suggesting any limitation to the scope of the present disclosure.

As shown in FIG. 1, the storage system 100 may include a plurality of client devices 110-1, 110-2, 110-3 . . . 110-M (collectively referred to as "clients 110" or individually referred to as "client 110" in the following), a plurality of servers 120-1, 120-2, 120-3 . . . 120-N (collectively referred to as "servers 120" or individually referred to as "server 120" in the following), and a target storage device 130. The plurality of clients 110, for example, may be coupled communicatively to one another via a network. The plurality of servers 120, for example, may be coupled communicatively to one another via the network. In addition, the plurality of clients 110 may communicate with the plurality of servers 120 via the network. In some embodiments, each client 110 may store data into the target storage device 130 via one or more servers 120, and may obtain the data from the target storage device 130 via the one or more servers 120 for access.

In some embodiments, the target storage device 130 may include one or more cloud storage devices. For example, different cloud storage devices may be from different providers. In some other embodiments, the servers 120 may be used to store data from the clients 110. In that case, the target storage device 130 as shown in FIG. 1 may be omitted, or the target storage device 130 may be implemented by one or more servers 120.

Figure 2:
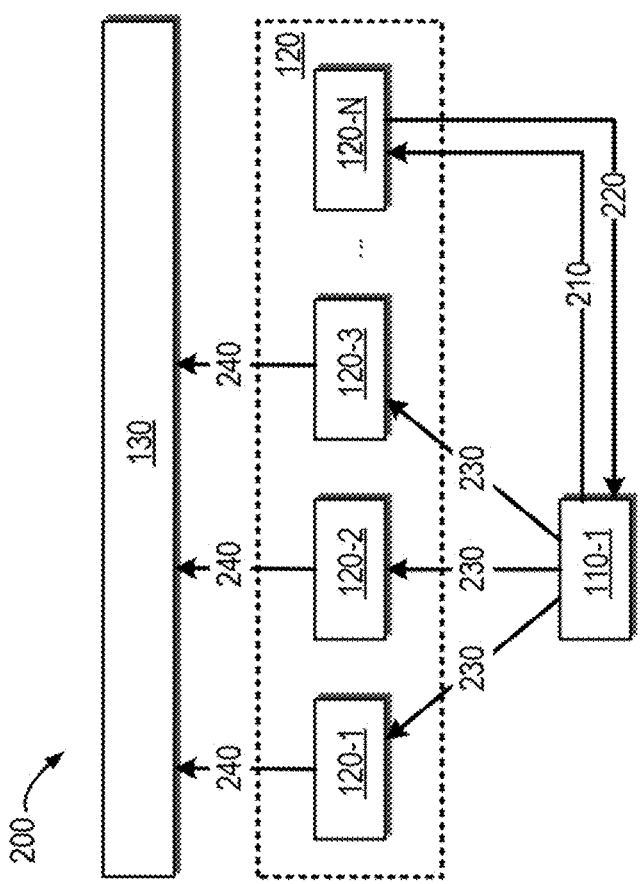
FIG. 2 illustrates a schematic diagram of an example process for storing data according to embodiments of the present disclosure.

FIG. 2 illustrates a schematic diagram of an example process 200 for storing data according to embodiments of the present disclosure. For the purpose of illustration, FIG. 2 only shows the client 110-1 as shown in FIG. 1. In some embodiments, when the client 110-1 joins the storage system 100 as shown in FIG. 1, any of the plurality of servers 120 may be assigned to it as a seed server. It is assumed here that the seed server assigned to the client 110-1 is the server 120-N.

As shown in FIG. 2, when the client 110-1 intends to store data, it may send 210 to the seed server 120-N a request for storing data into the storage device 130. In some embodiments, the client 110-1 may divide the data to be stored into a plurality of data blocks, and determine respective hash values of the plurality of data blocks. The client 110-1 may include the respective hash values of the plurality of data blocks in the request, and send the request to the seed server 120-N.

Responsive to receiving the request, the seed server 120-N may determine, based on the request and from the plurality of servers 120, at least one server for storing the data of the client 110-1 into the target storage device.

In some embodiments, as discussed above, the request may include the respective hash values of the plurality of data blocks into which the data to be stored is divided. Moreover, the plurality of servers 120 may be pre-assigned with respective identifiers. For example, the identifier of the server 120 may be determined by computing the hash value of feature data (e.g., an IP address, a host name, and the like) of the server 120, and the identifier of the server 120 may fall within the same value range, for example, from 0 to $2^{128}$, as the respective hash values of the plurality of data blocks. In some embodiments, for a data block of the plurality of data blocks, the seed server 120-N may extract the hash value of the data block from the request, and determine respective distances between the respective identifiers of the plurality of servers 120 and the hash value of the data block. For example, the distance between the hash value of the data block and the identifier of the server 120 may be obtained by performing an XOR operation on the two. Then, the seed server 120-N may select, based on the respective distances between the respective identifiers of the plurality of servers 120 and the hash value of the data block, a server for storing the data block into the target storage device 130 from the plurality of servers 120. For example, the seed server 120-N may select, from the plurality of servers 120, a server having the closest distance between its identifier and the hash value of the data block. In this way, the seed server 120-N can determine respective servers for storing the plurality of data blocks. In the example as shown in FIG. 2, it is assumed that the servers determined by the seed server 120-N are the servers 120-1, 120-2 and 120-3.

As shown in FIG. 2, the seed server 120-N may send 220 a response to the request to the client 110-1, and the response includes an indication on the servers 120-1, 120-2 and 120-3 (e.g., including respective addresses of the servers 120-1, 120-2 and 120-3). The client 110-1 may receive 220 the response to the request from the seed server 120-N, and determine the servers 120-1, 120-2 and 120-3 indicated by the response.

Then, the client 110-1 may send 230, to the servers 120-1, 120-2 and 120-3, requests for storing the plurality of data blocks to the target storage device 130, respectively. For example, each request may include one of the plurality of data blocks.

Responsive to receiving the respective requests from the client 110-1, the servers 120-1, 120-2 and 120-3 each may return, to the client 110, a response to the received request to achieve a short responding time. Subsequently, the servers 120-1, 120-2 and 120-3 may extract the data blocks from the received requests, and store 240 the plurality of data blocks to the target storage device 130, respectively.

In some embodiments, responsive to storing a data block of the plurality of data blocks to the target storage device 130, each of the servers 120-1, 120-2 and 120-3 may determine a hash value of the data block. Then, the server 120 may generate, based on the hash value of the data block and the storage location of the data block in the target storage device 130, metadata associated with the data block. The server 120 may record the generated metadata in a metadata list, for use in subsequent data access. In some embodiments, the metadata list may be implemented using a distributed hash table (e.g., a Kademlia distributed hash table). For example, the hash value of the data block and the storage location of the data block in the target storage device 130 may be stored as an entry in the distributed hash table in the form of a key-value pair.

It is assumed here that the data in FIG. 2 is divided into three data blocks, and the hash values of the three data blocks are "Qmer2i3uf23fjisdf1rA", "Qmer2i3uf23fjisdf1rB" and "Qmer2i3uf23fjisdf1rC", respectively. Table 1 shows an example distributed hash table according to embodiments of the present disclosure.

TABLE 1

Example Distributed Hash Table

| Key | Value |
|---|---|
| Qmer2i3uf23fjisdf1rA | http://mystorageaccount.blob.core.windows.net/mycontainer/dat-001-part-1 |
| Qmer2i3uf23fjisdf1rB | http://mystorageaccount.blob.core.windows.net/mycontainer/dat-001-part-2 |

TABLE 1-continued

Example Distributed Hash Table

| Key | Value |
| --- | --- |
| Qmer2i3uf23fjisdfl rC | http://mystorageaccount.blob.core.windows.net/mycontainer/dat-001-part-3 |

Figure 3:
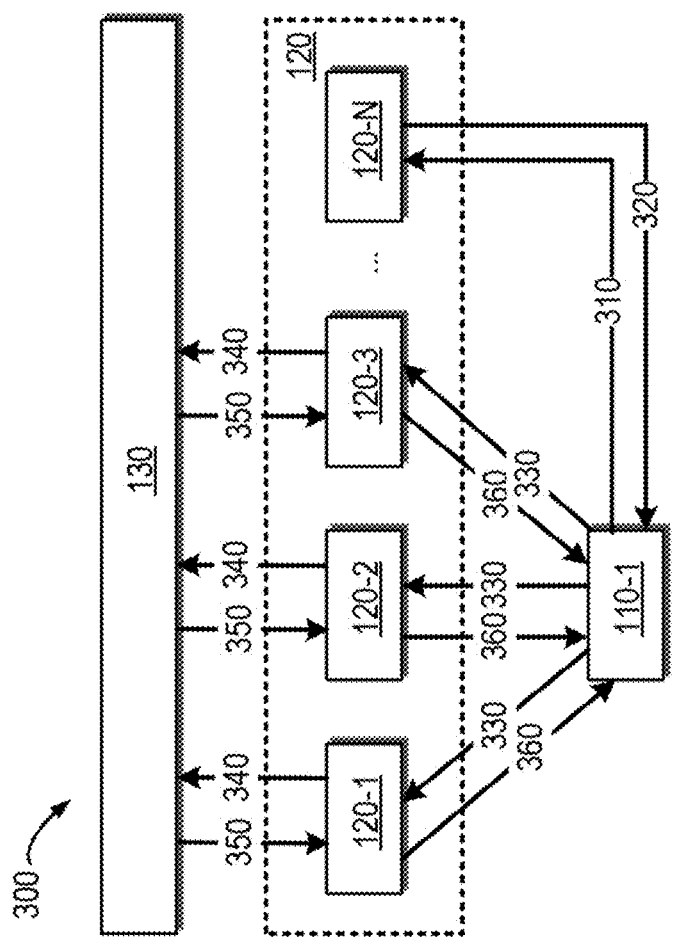
FIG. 3 illustrates a schematic diagram of an example process for accessing data according to embodiments of the present disclosure.

FIG. 3 illustrates an example process 300 for accessing data according to embodiments of the present disclosure. As shown in FIG. 3, when the client 110-1 intends to obtain the stored data from the target storage device 130 for access, it may send 310 to the seed server 120-N a request for obtaining data to be accessed from the target storage device 130. As described above, during the course of storing data, the data may be divided into a plurality of data blocks, and respective hash values of the plurality of data blocks may be determined. In some embodiments, the client 110-1 may include the respective hash values of the plurality of data blocks in the request, and send the request to the seed server 120-N.

Responsive to receiving the request, the seed server 120-N may determine, based on the request and from the plurality of servers 120, at least one server for obtaining the data to be accessed from the target storage device 130.

In some embodiments, as discussed above, the request may include respective hash values of the plurality of data blocks into which the data to be accessed is divided. Moreover, the plurality of servers 120 may be pre-assigned with respective identifiers, which may fall within the same value range, for example, from 0 to $2^{128}$, as the respective hash values of the plurality of data blocks. In some embodiments, for a data block of the plurality of data blocks, the seed server 120-N may extract the hash value of the data block from the request, and determine respective distances between the respective identifiers of the plurality of servers 120 and the hash value of the data block. For example, the distance between the hash value of the data block and the identifier of the server 120 may be obtained by performing an XOR operation on the two. Then, the seed server 120 may select, based on the respective distances between the respective identifiers of the plurality of servers 120 and the hash value of the data block, a server for obtaining the data block from the target storage device 130 from the plurality of servers 120. For example, the seed server 120-N may select, from the plurality of servers 120, a server having the closest distance between its identifier and the hash value of the data block. In this way, the seed server 120-N can determine respective servers for obtaining the plurality of data blocks. In the example as shown in FIG. 3, the servers determined by the seed server 120-N may be the servers 120-1, 120-2 and 120-3, for example.

As shown in FIG. 3, the seed server 120-N may send 320, to the client 110-1, a response to the request, including an indication on the servers 120-1, 120-2 and 120-3 (for example, including respective addresses of the servers 120-1, 120-2 and 120-3). The client 110-1 may receive 320 a response to the request from the seed server 120-N, and determines the servers 120-1, 120-2 and 120-3 indicated by the response.

Then, the client 110-1 may send 330 requests for obtaining a plurality of data blocks from the target storage device 130 to the servers 120-1, 120-2 and 120-3, respectively. For example, each request may include a hash value of a data block in the plurality of data blocks.

Responsive to receiving respective requests from the client 110-1, the servers 120-1, 120-2 and 120-3 may extract hash values of respective data blocks from the received requests, and search, based on the hash values, a metadata list (e.g., the distributed hash value as shown in Table 1) for metadata associated with the respective data blocks. For example, the metadata associated with each data block may be stored as an entry in the distributed hash value in the form of a key-value pair, where the key is the hash value of the data block and the value is the storage location of the data block in the target storage device 130. Each of the servers 120-1, 120-2 and 120-3 may determine, based on the metadata associated with a corresponding data block, the storage location of the corresponding data block in the target storage device 130.

Then, the servers 120-1, 120-2 and 120-3 may obtain 340 the plurality of data blocks from the determined respective storage locations of the plurality of data blocks in the target storage device 130. The target storage device 130 may return 350 the plurality of data blocks to the servers 120-1, 120-2 and 120-3, respectively. Then, the servers 120-1, 120-2 and 120-3 may return 360 the plurality of data blocks to the client 110-1 for access by the client 110-1.

It can be seen from the above description that, embodiments of the present disclosure provide a solution for storing and accessing data. In the solution, a decentralized unified object storage architecture is implemented to solve the problem in the traditional storage solutions. The solution can solve the single point of failure using the decentralized storage architecture. The solution can implement parallel processing by dividing the data into multiple data blocks. Meanwhile, the decentralized architecture allows clients to connect to multiple different servers at the same time, thereby improving system throughput. In addition, this solution solves the problem that traditional solutions are difficult to scale by using an extended distributed hash table for routing in the distributed storage architecture. Benefiting from the routing mechanism of the distributed hash table, this solution allows the servers to be extended without affecting the clients. In addition, the solution can be easily integrated with existing distributed storage architectures.

Figure 4:
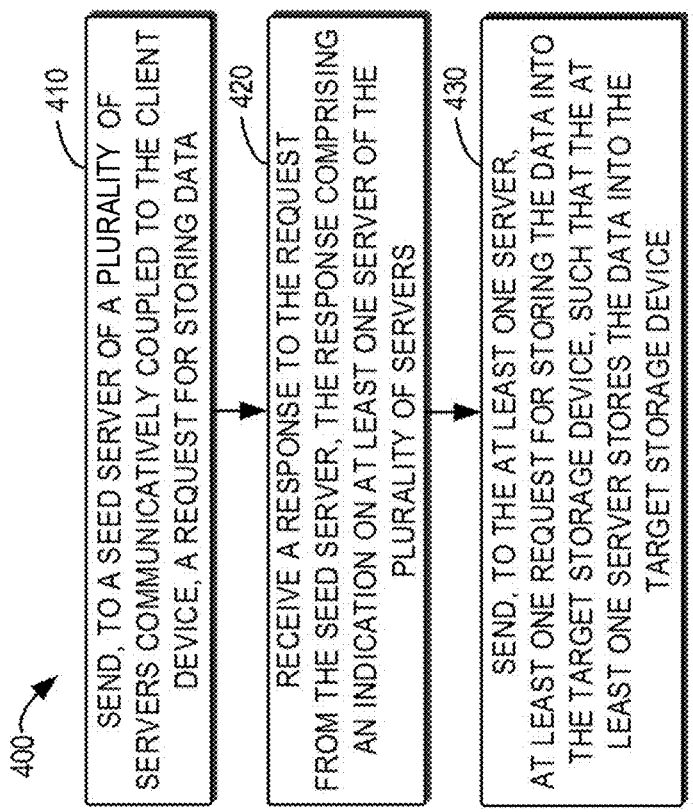
FIG. 4 illustrates a flowchart of an example method for storing data according to embodiments of the present disclosure.

FIG. 4 illustrates a flowchart of an example method 400 for storing data according to embodiments of the present disclosure. For example, the method 400 may be performed by the client device 110-1 as shown in FIG. 2. The method 400 will be described in detail below with reference to FIG. 2. It is to be understood that the method 400 may include additional acts not shown and/or may omit some acts as shown, and the scope of the present disclosure is not limited in the aspect.

At block 410, the client device 110-1 sends, to a seed server (e.g., the server 120-N) of the plurality of servers 120 communicatively coupled to the client device 110-1, a request for storing data.

At block 420, the client device 110-1 receives a response to the request from the seed server 120-N, where the response comprises an indication on at least one server (e.g., the servers 120-1, 120-2 and 120-3) of the plurality of servers 120 for storing the data into the target storage device 130.

At block 430, the client device 110-1 sends, to the at least one server (e.g., the servers 120-1, 120-2 and 120-3), at least one request for storing the data into the target storage device 130, such that the at least one server (e.g., the servers 120-1, 120-2 and 120-3) stores the data into the target storage device 130.

In some embodiments, sending the request to the seed server comprises: dividing the data into at least one data block; determining respective hash values of the at least one data block; including the respective hash values of the at least one data block in the request; and sending, to the seed server, the request including the respective hash values of the at least one data block.

In some embodiments, the number of the at least one server indicated by the seed server corresponds to the number of the at least one data block, and sending the at least one request to the at least one server comprises: generating the at least one request based on the at least one data block, wherein one of the at least one request comprises one of the at least one data block; and sending the at least one request to the at least one server, respectively.

In some embodiments, the method 400 further comprises: receiving at least one response from the at least one server, the at least one response indicating that the at least one server has received the at least one request.

In some embodiments, the target storage device comprises a cloud storage device.

In some embodiments, the target storage device comprises the at least one server.

Figure 5:
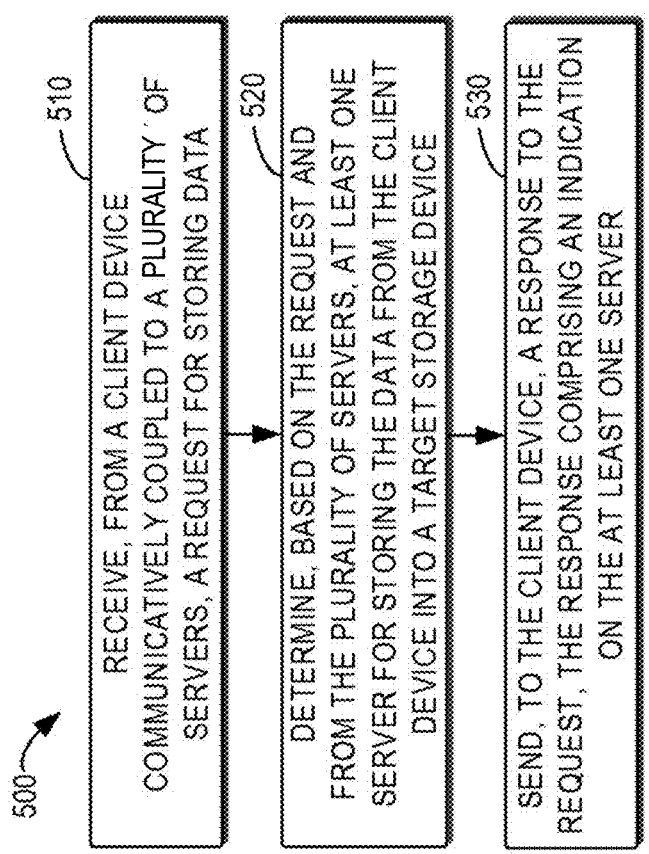
FIG. 5 illustrates a flowchart of an example method for storing data according to embodiments of the present disclosure.

FIG. 5 illustrates a flowchart of an example method 500 for storing data according to embodiments of the present disclosure. The method 500 will be described in detail below with reference to FIG. 2. It is to be understood that the method 500 may include additional acts not shown and/or may omit some acts as shown, and the scope of the present disclosure is not limited in the aspect.

At block 510, the seed server 120-N receives a request for storing data from the client device 110-1 communicatively coupled to the plurality of servers 120.

At block 520, the seed server 120-N determines, based on the request and from the plurality of servers 120, at least one server (e.g., the servers 120-1, 120-2 and 120-3) for storing the data from the client device 110-1 into the target storage device 130.

At block 530, the seed server 120-N sends a response to the request to the client device 110-1, the response comprising an indication on the at least one server (e.g., the servers 120-1, 120-2 and 120-3).

In some embodiments, the request comprises respective hash values of at least one data block into which the data to be stored is divided, the plurality of servers have respective identifiers, and the identifiers and the respective hash values of the at least one data block fall within a same value range. Determining the at least one server from the plurality of servers comprises: for a data block of the at least one data block, extracting a hash value of the data block from the request; determining respective distances between the respective identifiers of the plurality of servers and the hash value of the data block; and selecting, based on the distances and from the plurality of servers, a server for storing the data block into the target storage device.

Figure 6:
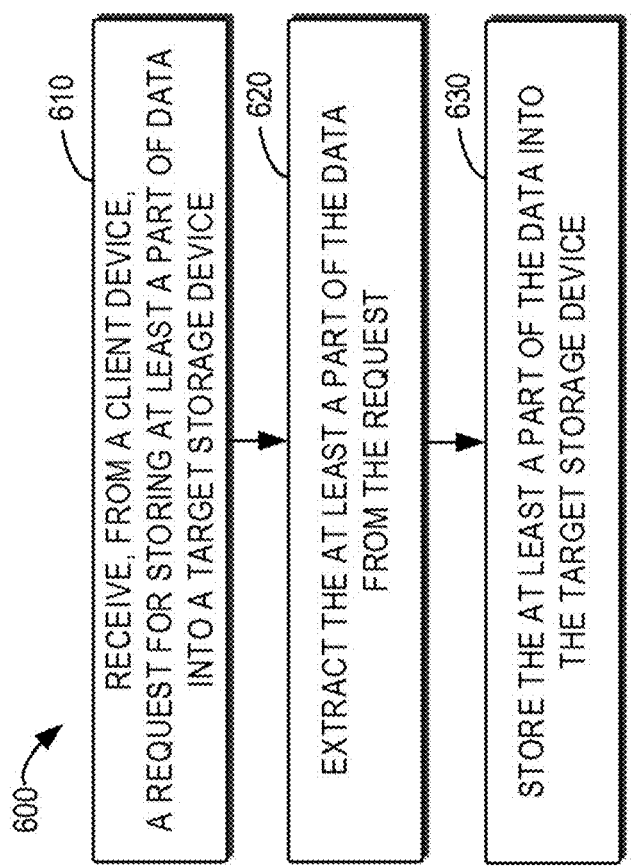
FIG. 6 illustrates a flowchart of an example method for storing data according to embodiments of the present disclosure.

FIG. 6 illustrates a flowchart of an example method 600 for storing data according to embodiments of the present disclosure. For example, the method 600 may be performed by the servers 120-1, 120-2 and/or 120-3 as shown in FIG. 2. The method 600 will be described in detail below with reference to FIG. 2 and taking the server 120-1 as an example. It is to be understood that the method 600 may include additional acts not shown and/or may omit some acts as shown, and the scope of the present disclosure is not limited in the aspect.

At block 610, the server 120-1 receives, from the client device 110-1 communicatively coupled to the plurality of servers 120, a request for storing at least a part of data into the target storage device 130, where the request is sent by the client device 110-1 in response to receiving an indication on the server 120-1 from the seed server 120-N of the plurality of servers 120.

At block 620, the server 120-1 extracts the at least a part of the data from the request.

At block 630, the server 120-1 stores the at least a part of the data into the target storage device 130.

In some embodiments, the method 600 further comprises, in response to the at least a part of the data being stored into the target storage device, determining a hash value of the at least a part of the data; generating, based on the hash value and a storage location of the at least a part of the data in the target storage device, metadata associated with the at least a part of the data; and recording the metadata in a metadata list associated with the server.

In some embodiments, the metadata list is a distributed hash table.

In some embodiments, the method 600 further comprises, in response to receiving the request, sending, to the client device, a response to the request to indicate that the server has received the request.

In some embodiments, the target storage device comprises a cloud storage device.

In some embodiments, the target storage device comprises the server.

Figure 7:
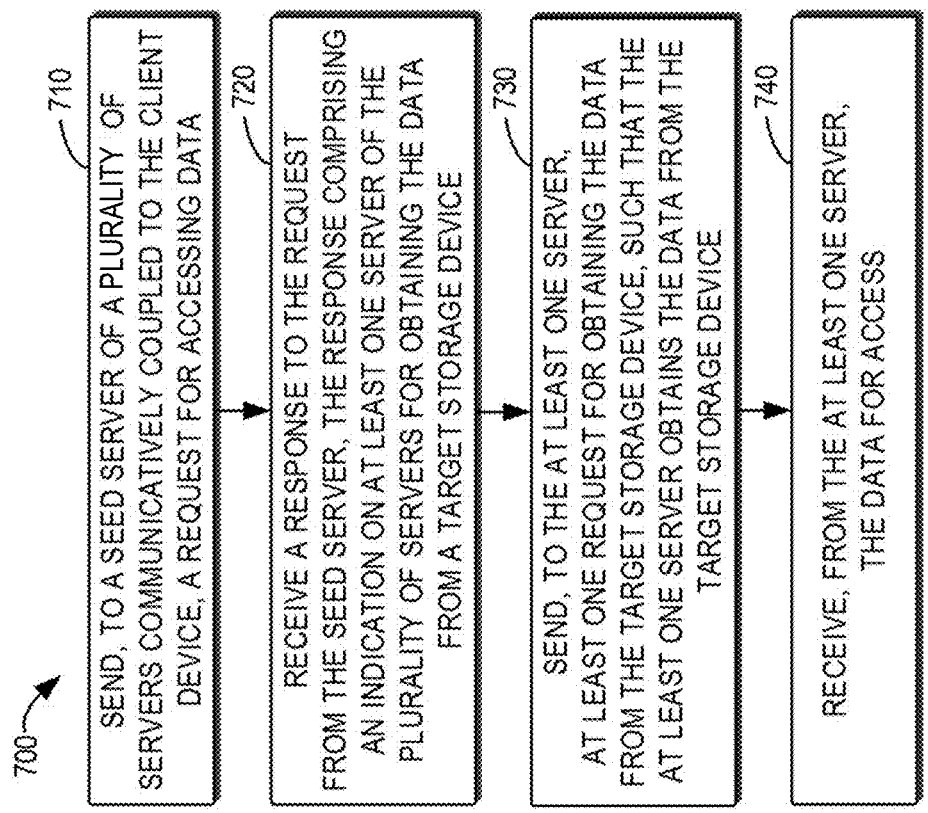
FIG. 7 illustrates a flowchart of an example method for accessing data according to embodiments of the present disclosure.

FIG. 7 illustrates a flowchart of an example method 700 for accessing data according to embodiments of the present disclosure. For example, the method 700 may be performed by the client device 110-1 as shown in FIG. 3. The method 700 will be described in detail below with reference to FIG. 3. It is to be understood that the method 700 may include additional acts not shown and/or may omit some acts as shown, and the scope of the present disclosure is not limited in the aspect.

At block 710, the client device 110-1 sends, to the seed server (e.g., the server 120-N) of the plurality of servers 120 communicatively coupled to the client device 110-1, a request for accessing data.

At block 720, the client device 110-1 receives a response to the request from the seed server 120-N, the response comprising an indication on at least one server (e.g., the servers 120-1, 120-2 and 120-3) of the plurality of servers 120 for obtaining the data to be accessed from the target storage device 130.

At block 730, the client device 110-1 sends, to the at least one server (e.g., the servers 120-1, 120-2 and 120-3), at least one request for obtaining the data to be accessed from the target storage device 130, such that the at least one server (e.g., the servers 120-1, 120-2 and 120-3) obtains the data from the target storage device 130.

At block 740, the client device 110-1 receives the data from the at least one server (e.g., the servers 120-1, 120-2 and 120-3) for access.

In some embodiments, sending the request to the seed server comprises determining respective hash values of at least one data block into which the data is divided, including the respective hash values of the at least one data block in the request, and sending, to the seed server, the request including the respective hash values of the at least one data block.

In some embodiments, the number of the at least one server indicated by the seed server corresponds to the number of the at least one data block, and sending the at least one request to the at least one server comprises generating the at least one request based on the respective hash values of the at least one data block, wherein one of the at least one request comprises a hash value of one of the at least one data block, and sending the at least one request to the at least one server, respectively.

In some embodiments, the target storage device comprises a cloud storage device.

In some embodiments, the target storage device comprises the at least one server.

Figure 8:
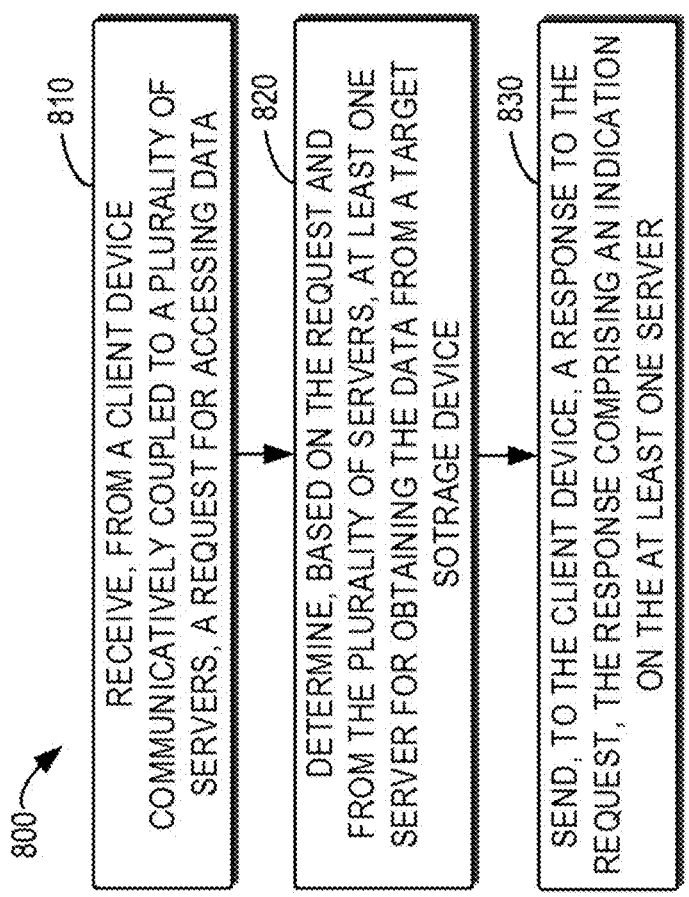
FIG. 8 illustrates a flowchart of an example method for accessing data according to embodiments of the present disclosure.

FIG. 8 illustrates a flowchart of an example method 800 for accessing data according to embodiments of the present disclosure. For example, the method 800 may be performed by the seed server 120-N as shown in FIG. 3. The method 800 will be described in detail below with reference to FIG. 3. It is to be understood that the method 800 may include additional acts not shown and/or may omit some acts as shown, and the scope of the present disclosure is not limited in the aspect.

At block 810, the seed server 120-N receives a request for accessing data from the client device 110-1 communicatively coupled to the plurality of servers 120.

At block 820, the seed server 120-N determines, based on the request and from the plurality of servers 120, at least one server (e.g., the servers 120-1, 120-2 and 120-3) for obtaining the data to be accessed from the target storage device 130.

At block 830, the seed server 120-N sends a response to the request to the client device 110-1, the response comprising an indication on the at least one server (e.g., the servers 120-1, 120-2 and 120-3).

In some embodiments, the request comprises respective hash values of at least one data block into which the data to be accessed is divided, the plurality of servers have respective identifiers, and the identifiers and the respective hash values of the at least one data block fall within a same value range. Determining the at least one server from the plurality of servers comprises, for a data block of the at least one data block, extracting a hash value of the data block from the request, determining respective distances between the respective identifiers of the plurality of servers and the hash value of the data block, and selecting, based on the distances and from the plurality of servers, a server for obtaining the data block from the target storage device.

Figure 9:
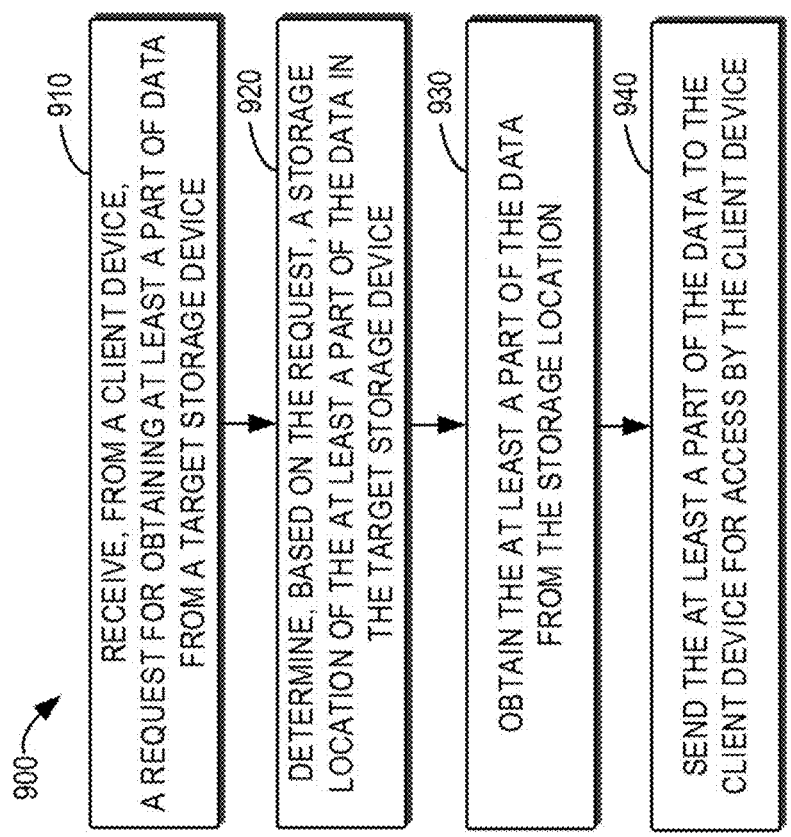
FIG. 9 illustrates a flowchart of an example method for accessing data according to embodiments of the present disclosure.

FIG. 9 illustrates a flowchart of an example method 900 for accessing data according to embodiments of the present disclosure. For example, the method 900 may be performed by the servers 120-1, 120-2 and/or 120-3 as shown in FIG. 3. The method 900 will be described in detail below with reference to FIG. 3 and taking the server 120-1 as an example. It is to be understood that the method 900 may include additional acts not shown and/or may omit some acts as shown, and the scope of the present disclosure is not limited in the aspect.

At block 910, the server 120-1 receives, from the client device 110-1 communicatively coupled to the plurality of servers 120, a request for obtaining at least a part of data to be accessed from the target storage device 130, where the request is sent by the client device 110-1 in response to receiving an indication on the server 120-1 from the seed server 120-N of the plurality of servers 120.

At block 920, the server 120-1 determines, based on the request, a storage location of the at least a part of the data in the target storage device 130.

At block 930, the server 120-1 obtains the at least a part of the data from the storage location.

At block 940, the server 120-1 sends the at least a part of the data to the client device 110-1 for access by the client device 110-1.

In some embodiments, the request comprises a hash value of the at least a part of the data, and determining the storage location comprises extracting the hash value from the request; searching, based on the hash value, a metadata list associated with the server for metadata associated with the at least a part of the data, wherein the metadata is generated based on the hash value and the storage location, and determining the storage location based on the metadata.

In some embodiments, the metadata list is a distributed hash table.

In some embodiments, the target storage device comprises a cloud storage device.

In some embodiments, the target storage device comprises the server.

In some embodiments, a method for storing data comprises receiving, at a server and from a client device communicatively coupled to a plurality of servers comprising the server, a request for storing at least a part of data into a target storage device, wherein the request is sent by the client device in response to receiving an indication on the server from a seed server of the plurality of servers, extracting the at least a part of the data from the request, and storing the at least a part of the data into the target storage device.

The method may further comprise, in response to the at least a part of the data being stored into the target storage device, determining a hash value of the at least a part of the data, generating, based on the hash value and a storage location of the at least a part of the data in the target storage device, metadata associated with the at least a part of the data, and recording the metadata in a metadata list associated with the server. The metadata list may be a distributed hash table.

The method may further comprise, in response to receiving the request, sending, to the client device, a response to the request to indicate that the server has received the request. The target storage device may comprise a cloud storage device. Further, the target storage device may comprise the server.

In some embodiments, a method for accessing data comprises sending, at a client device and to a seed server of a plurality of servers communicatively coupled to the client device, a request for accessing data, receiving a response to the request from the seed server, the response comprising an indication on at least one server of the plurality of servers for obtaining the data to be accessed from a target storage device, sending, to the at least one server, at least one request for obtaining the data to be accessed from the target storage device, such that the at least one server obtains the data from the target storage device, and receiving, from the at least one server, the data for access.

The step of sending the request to the seed server may comprise determining respective hash values of at least one data block into which the data is divided, including the respective hash values of the at least one data block in the request, and sending, to the seed server, the request including the respective hash values of the at least one data block.

The number of the at least one server indicated by the seed server may correspond to the number of the at least one data block, and wherein sending the at least one request to the at least one server may comprise generating the at least one request based on the respective hash values of the at least one data block, wherein one of the at least one request comprises a hash value of one of the at least one data block, and sending the at least one request to the at least one server, respectively. The target storage device may comprise a cloud storage device. Further, the target storage device may comprise the server.

In some embodiments, a method for accessing data comprises receiving, from a client device communicatively coupled to a plurality of servers, a request for accessing data, determining, based on the request and from the plurality of servers, at least one server for obtaining the data to be accessed from a target storage device, and sending, to the client device, a response to the request, the response comprising an indication on the at least one server.

The request may comprise respective hash values of at least one data block into which the data to be accessed is divided, the plurality of servers may have respective identifiers, and the identifiers and the respective hash values of the at least one data block may fall within a same value range, and wherein determining the at least one server from the plurality of servers may comprise, for a data block of the at least one data block, extracting a hash value of the data block from the request, determining respective distances between the respective identifiers of the plurality of servers and the hash value of the data block, and selecting, based on the distances and from the plurality of servers, a server for obtaining the data block from the target storage device.

In some embodiments, a method for accessing data comprises receiving, at a server and from a client device communicatively coupled to a plurality of servers comprising the server, a request for obtaining at least a part of data to be accessed from a target storage device, wherein the request is sent by the client device in response to receiving an indication on the server from a seed server of the plurality of servers, determining, based on the request, a storage location of the at least a part of the data in the target storage device, obtaining the at least a part of the data from the storage location, and sending the at least a part of the data to the client device for access by the client device.

The request may comprise a hash value of the at least a part of the data, and wherein determining the storage location may comprise extracting the hash value from the request, searching, based on the hash value, a metadata list associated with the server for metadata associated with the at least a part of the data, wherein the metadata is generated based on the hash value and the storage location, and determining the storage location based on the metadata.

The metadata list may be a distributed hash value table. The target storage device may comprise a cloud storage device. Further, the target storage device may comprise the server.

In some embodiments, a client device comprises at least one processing unit, and at least one memory coupled to the at least one processing unit and storing instructions for execution by the at least one processing unit, the instructions, when executed by the at least one processing unit, causing the client device to perform one or more of the above methods.

In some embodiments, a server comprises at least one processing unit, and at least one memory coupled to the at least one processing unit and storing instructions for execution by the at least one processing unit, the instructions, when executed by the at least one processing unit, causing the server to perform one or more of the above methods.

Some embodiments comprise a computer program product tangibly stored in a computer storage medium and including machine-executable instructions, the machine-executable instructions, when executed by a device, causing the device to perform one or more of the above methods.

Figure 10:
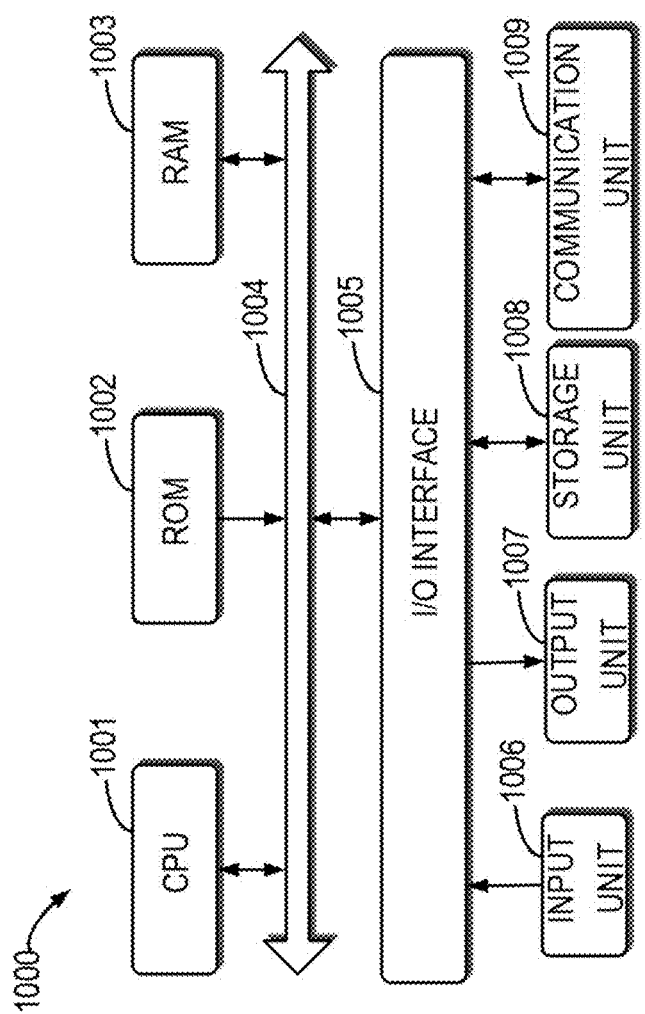
FIG. 10 illustrates a schematic block diagram of an example device that can be used to implement embodiments of the present disclosure.

FIG. 10 illustrates a block diagram of an example device 1000 that can be used to implement embodiments of the present disclosure. For example, the client device 110 and/or the server 120 as shown in FIG. 1 may be implemented by the device 1000. As shown in FIG. 10, the device 1000 includes a central processing unit (CPU) 1001 which performs various appropriate actions and processing, based on computer program instructions stored in a read-only memory (ROM) 1002 or computer program instructions loaded from a storage unit 1008 to a random access memory (RAM) 1003. The memory 1003 stores therein various programs and data required for operations of the device 1000. The CPU 1001, the ROM 1002 and the memory 1003 are connected via a bus 1004 with one another. An input/output (I/O) interface 1005 is also connected to the bus 1004.

The following components in the device 1000 are connected to the I/O interface 1005: an input unit 1006 such as a keyboard, a mouse and the like; an output unit 1007 including various kinds of displays and a loudspeaker, etc.; a storage unit 1008 such as a magnetic disk, an optical disk, and etc.; a communication unit 1009 including a network card, a modem, and a wireless communication transceiver, etc. The communication unit 1009 allows the device 1000 to exchange information/data with other devices through a computer network such as the Internet and/or various kinds of telecommunications networks.

Various processes and processing described above, e.g., methods 400, 500, 600, 700, 800 and/or 900, may be executed by the processing unit 1001. For example, in some embodiments, methods 400, 500, 600, 700, 800 and/or 900 may be implemented as a computer software program that is tangibly included in a machine readable medium, e.g., the storage unit 1008. In some embodiments, part or all of the computer programs may be loaded and/or mounted onto the device 1000 via ROM 1002 and/or communication unit 1009. When the computer program is loaded to the RAM 1003 and executed by the CPU 1001, one or more steps of methods 400, 500, 600, 700, 800 and/or 900 as described above may be executed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/actions specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/action specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing data, comprising:
    sending, from a client device to a seed server of a plurality of servers communicatively coupled to the client device, a request for storing data, wherein the request comprises two or more hash values of two or more data blocks, respectively, into which the data to be stored is divided;
    receiving, at the client device, a response to the request from the seed server, the response comprising an indication of at least one server of the plurality of servers for storing the data into a target storage device based in part on respective distances between respective identifiers of the plurality of servers and the two or more hash values of the two or more data blocks; and
    sending, from the client device to the at least one server, at least one request for storing the data into the target storage device;
    wherein the identifier for a given one of the plurality of servers is computed as a hash value of feature data associated with the given server, the hash value of the feature data associated with the given server being within a same value range as the two or more hash values of the two or more data blocks.

2. The method of claim 1, wherein sending the request to the seed server comprises:
   dividing the data into the two or more data blocks;
   determining respective hash values of the two or more data blocks;
   including the respective hash values of the two or more data blocks in the request; and
   sending, to the seed server, the request including the respective hash values of the two or more data blocks.

3. The method of claim 2, wherein the number of the at least one server indicated by the seed server corresponds to the number of the two or more data blocks, and wherein sending the at least one request to the at least one server comprises:
   generating the at least one request based on the two or more data blocks, wherein one of the at least one request comprises one of the two or more data blocks; and
   sending the at least one request to the at least one server, respectively.

4. The method of claim 1, further comprising receiving at least one response from the at least one server, the at least one response indicating that the at least one server has received the at least one request.

5. The method of claim 1, wherein the target storage device comprises a cloud storage device.

6. The method of claim 1, wherein the target storage device comprises the at least one server.

7. A computer program product tangibly stored in a computer storage medium and including machine-executable instructions, the machine-executable instructions, when executed by a device, causing the device to perform steps of the method of claim 1.

8. A client device comprises;
   at least one processing unit; and
   at least one memory coupled to the at least one processing unit and storing instructions for execution by the at least one processing unit, the instructions, when executed by the at least one processing unit, causing the client device to:
   send to a seed server of a plurality of servers communicatively coupled to the client device, a request for storing data, wherein the request comprises two or more hash values of two or more data blocks, respectively, into which the data to be stored is divided;
   receive a response to the request from the seed server, the response comprising an indication of at least one server of the plurality of servers for storing the data into a target storage device based in part on respective distances between respective identifiers of the plurality of servers and the two or more hash values of the two or more data blocks; and
   send, to the at least one server, at least one request for storing the data into the target storage device;
   wherein the identifier for a given one of the plurality of servers is computed as a hash value of feature data associated with the given server, the hash value of the feature data associated with the given server being within a same value range as the two or more hash values of the two or more data blocks.

9. The client device of claim 8, wherein sending the request to the seed server comprises:
   dividing the data into the two or more data blocks;
   determining respective hash values of the two or more data blocks;
   including the respective hash values of the two or more data blocks in the request; and
   sending, to the seed server, the request including the respective hash values of the two or more data blocks.

10. The client device of claim 9, wherein the number of the at least one server indicated by the seed server corresponds to the number of the two or more data blocks, and wherein sending the at least one request to the at least one server comprises:
    generating the at least one request based on the two or more data blocks, wherein one of the at least one request comprises one of the two or more data blocks; and
    sending the at least one request to the at least one server, respectively.

11. The client device of claim 8, wherein the instructions, when executed by the at least one processing unit, further causing the client device to receive at least one response from the at least one server, the at least one response indicating that the at least one server has received the at least one request.

12. The client device of claim 8, wherein the target storage device comprises a cloud storage device.

13. The client device of claim 8, wherein the target storage device comprises the at least one server.

14. A method for storing data, comprising:
    receiving, from a client device communicatively coupled to a plurality of servers, a request for storing data, wherein the request comprises two or more hash values of two or more data blocks, respectively, into which the data to be stored is divided;
    determining, based on the request and from the plurality of servers, at least one server for storing the data from the client device into a target storage device; and
    sending, to the client device, a response to the request, the response comprising an indication of the at least one server based in part on respective distances between respective identifiers of the plurality of servers and the two or more hash values of the two or more data blocks;
    wherein the identifier for a given one of the plurality of servers is computed as a hash value of feature data associated with the given server, the hash value of the feature data associated with the given server being within a same value range as the two or more hash values of the two or more data blocks.

15. The method of claim 14, wherein the request comprises respective hash values of the two or more data blocks into which the data to be stored is divided, the plurality of servers have respective identifiers, and the identifiers and the respective hash values of the two or more data blocks fall within the same value range, and wherein determining the at least one server from the plurality of servers comprises:
    for a data block of the two or more data blocks,
    extracting a hash value of the data block from the request;
    determining respective distances between the respective identifiers of the plurality of servers and the hash value of the data block; and
    selecting, based on the distances and from the plurality of servers, a server for storing the data block into the target storage device.

16. A computer program product tangibly stored in a computer storage medium and including machine-executable instructions, the machine-executable instructions, when executed by a device, causing the device to perform steps of the method of claim 14.

17. An apparatus comprises at least one processing unit and at least one memory coupled to the at least one processing unit and storing instructions for execution by the at least one processing unit, the instructions, when executed by the at least one processing unit, causing the apparatus to perform steps of the method of claim 14.

18. The apparatus of claim 17, wherein the request comprises respective hash values of two or more data blocks into which the data to be stored is divided, the plurality of servers have respective identifiers, and the identifiers and the respective hash values of the at least one data block fall within the same value range, and wherein determining the at least one server from the plurality of servers comprises:

for a data block of the two or more data blocks, extracting a hash value of the data block from the request;

determining respective distances between the respective identifiers of the plurality of servers and the hash value of the data block; and selecting, based on the distances and from the plurality of servers, a server for storing the data block into the target storage device.

19. The apparatus of claim 17, wherein the target storage device comprises a cloud storage device.

20. The apparatus of claim 17, wherein the target storage device comprises the at least one server.

\* \* \* \* \*